(12) United States Patent
Zarakas et al.

(10) Patent No.: US 11,640,510 B2
(45) Date of Patent: *May 2, 2023

(54) SMART CARD WITH SENSORS FOR DETECTING ENVIRONMENTAL CONDITIONS

(71) Applicant: Capital One Services, LLC, McLean, VA (US)

(72) Inventors: James Zarakas, Centreville, VA (US); Molly Johnson, Alexandria, VA (US); Adam Vukich, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/679,599

(22) Filed: Feb. 24, 2022

(65) Prior Publication Data

US 2022/0391653 A1 Dec. 8, 2022

Related U.S. Application Data

(63) Continuation of application No. 17/173,575, filed on Feb. 11, 2021, now Pat. No. 11,263,505, which is a (Continued)

(51) Int. Cl.
*G06K 19/07* (2006.01)
*G06Q 20/34* (2012.01)

(52) U.S. Cl.
CPC ..... *G06K 19/0717* (2013.01); *G06K 19/0702* (2013.01); *G06Q 20/341* (2013.01)

(58) Field of Classification Search
CPC ........... G06K 19/0717; G06K 19/0702; G06K 19/00; G06K 19/04; G06K 19/06; G06K 19/07; G06Q 20/341
(Continued)

(56) References Cited

U.S. PATENT DOCUMENTS 4,119,361 A 10/1978 Greenaway
5,971,282 A 10/1999 Rollender et al.
(Continued)

OTHER PUBLICATIONS

European Search Report from European Patent Application No. 21275011.1 dated Jul. 1, 2021.

*Primary Examiner* — Edwyn Labaze
(74) *Attorney, Agent, or Firm* — Greenberg Traurig, LLP

(57) ABSTRACT

In some embodiments, a smart card may include a substrate with a first side and a second side. A first protective layer covers the first side and a second protective layer covers the second side of the substrate. Circuitry held in the substrate includes electronic interconnects for interconnecting circuitry elements. The circuitry elements include a processor, power circuitry for powering the circuitry elements, and an environmental detection sensor for respectively detecting a predetermined environmental parameter. The processor is configured to receive an output from the environmental detection sensor, to determine from the output that the environmental detection sensor detected an environmental alert trigger condition, and to generate an alert that is representative of the environmental alert trigger condition. The protective layers include pores in a region proximate to the environmental detection sensor for exposing the environmental detection sensor to an environment around the smart card.

20 Claims, 6 Drawing Sheets

Related U.S. Application Data continuation of application No. 16/780,374, filed on Feb. 3, 2020, now Pat. No. 10,929,735.

(58) Field of Classification Search
USPC .............................. 235/492, 380, 487, 375
See application file for complete search history.

(56) References Cited

U.S. PATENT DOCUMENTS

| | | |
|---|---|---|
| 8,918,900 B2 | 12/2014 | Saito |
| 10,417,626 B1 | 9/2019 | Locke et al. |
| 2005/0017082 A1 | 1/2005 | Moran et al. |
| 2005/0240778 A1 | 10/2005 | Saito |
| 2009/0226052 A1 | 9/2009 | Fedele et al. |
| 2012/0197090 A1* | 8/2012 | Chen ................... A61B 5/0015 |
| | | 600/301 |
| 2014/0170967 A1* | 6/2014 | Chateau ............... H04B 5/0037 |
| | | 455/41.1 |

* cited by examiner

SMART CARD WITH SENSORS FOR DETECTING ENVIRONMENTAL CONDITIONS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to an improved smart card with sensors for detecting environmental conditions.

BACKGROUND OF TECHNOLOGY

A smart card also known as a chip card, or an integrated circuit card, is a physical electronic authorization device which controls access to a resource. A smart card may include an embedded integrated circuit (IC) chip.

SUMMARY OF DESCRIBED SUBJECT MATTER

In some embodiments, the present disclosure provides an exemplary technically improved smart card that may include at least the following components of:
 a substrate with a first side and a second side;
 a first protective layer and second protective layer;
 wherein the first protective layer may cover the first side and the second protective layer may cover the second side of the substrate;
 circuitry held in the substrate may include a plurality of electronic interconnects for interconnecting a plurality of circuitry elements;
 wherein the plurality of circuitry elements may include:
 (i) at least one environmental detection sensor for respectively detecting at least one predetermined environmental parameter;
 (ii) power circuitry for powering the circuitry elements; and
 (iii) a processor;
 wherein the processor may be configured to:
 receive an output from the at least one environmental detection sensor;
 determine from the output that the at least one environmental detection sensor detected the at least one predetermined environmental parameter meeting at least one environmental alert trigger condition; and
 generate an alert that is representative of the at least one environmental alert trigger condition; and
 wherein the first protective layer, the second protective layer, or both, may include a plurality of pores in at least one region proximate to the at least one environmental detection sensor held in the substrate for exposing the at least one environmental detection sensor held in the substrate to an environment around the smart card.

In some embodiments, the present disclosure provides an exemplary technically improved computer-based method that includes at least the following steps of:
 receiving, by a processor in circuitry of a smart card, an output from at least one environmental detection sensor;
 wherein the at least one environmental detection sensor may be held in a substrate;
 wherein the smart card may be configured to expose the at least one environmental detection sensor held in the substrate to an environment around the smart card for respectively detecting at least one predetermined environmental parameter;
 determining, by the processor, from the output that the at least one environmental detection sensor detected the at least one predetermined environmental parameter meeting at least one environmental alert trigger condition; and
 generating, by the processor, an alert that is representative of the at least one environmental alert trigger condition.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
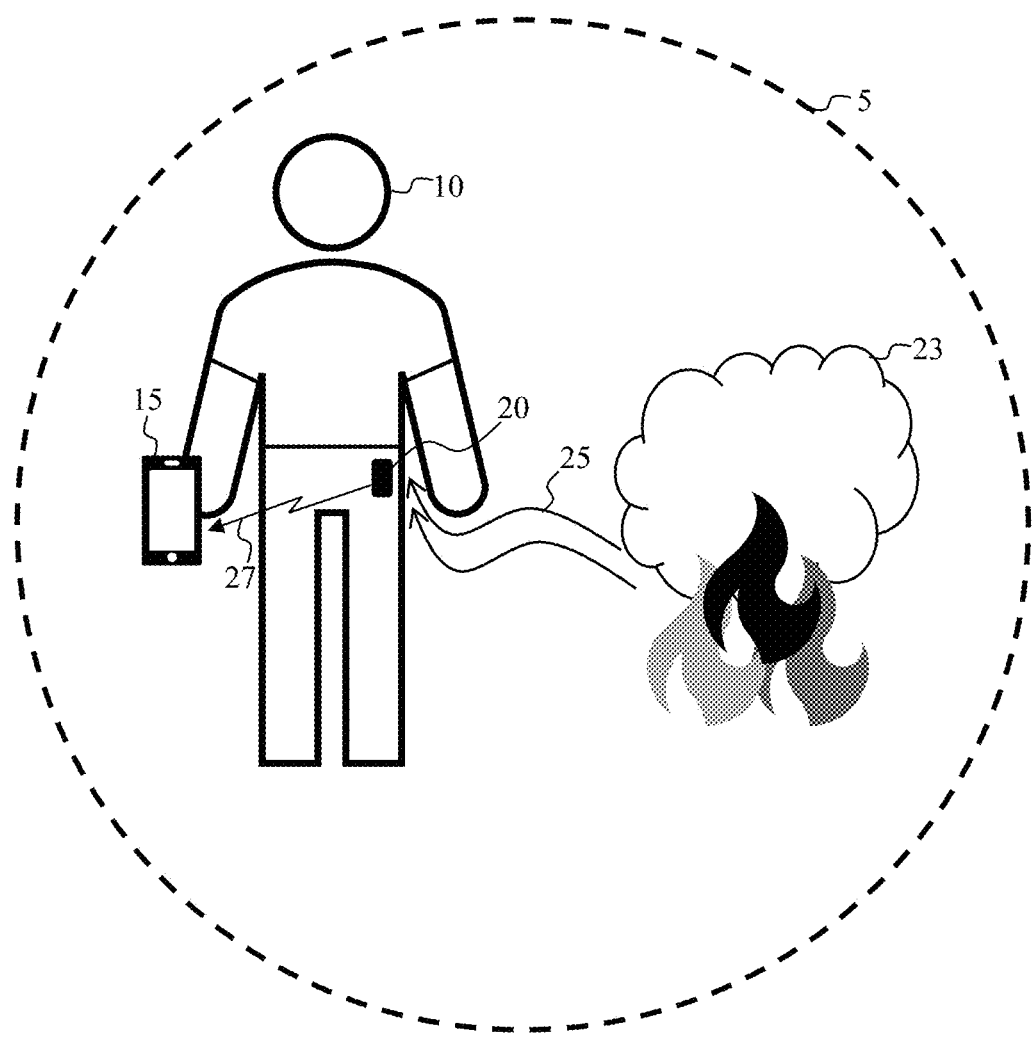
FIG. 1 depicts a region of an environment around a smart card for detecting environmental conditions, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, the term "smart card" can refer to an electronic card with at least one embedded microprocessor. In some embodiments, the smart card may be dimensioned and/or be utilized such as, but not limited to, a conventional credit or debit card issued to account holders by banks and other financial institutions. In some embodiments, the smart card may be dimensioned and/or be utilized such as, but not limited to, personal identification cards, health entitlement cards, store loyalty cards, stored value cards (electronic purses), information storage cards, and the like. In some embodiments, the smart card may be dimensioned, but not limited to, in accordance with international standard ISO/IEC 7810, ID-1 format, which specifies dimensions of 85.60 mm (85.60×10−3 m) long by 53.98 mm (53.98×10−3 m) wide. In some embodiments, the smart card may be dimensioned, but not limited to, in accordance with international standard ISO/IEC 7813 further specifies the thickness as 0.76 mm (0.76×10−3 m). For example, the smart card may be made of a plastic material, metal or similar material, and may have convenient overall dimensions of 7.5 cm by 11 cm by 1 cm similar to a common wallet.

Embodiments of the present disclosure describe a smart card for detecting at least one environmental condition and methods of use thereof. A smart card may include circuitry further including environmental detection sensors such as a smoke detector, a radon gas detector, and/or a carbon monoxide detector, for detecting environmental hazards. The environmental detection sensors may be disposed on a substrate with a first side and a second side. A first protective cover and a second protective cover may be used to respectively cover the first side and the second side of the substrate for protecting the circuitry. Furthermore, the first protective cover and/or the second protective cover may include a plurality of pores in a region proximate to the environmental detection sensors disposed on the substrate for exposing the environmental detection sensors to an environment around the smart card. Additionally, and/or optionally, the smart card may include functionality to allow a user to perform secure operations in a computing system of an entity, such transactions with a merchant on a terminal, for example.

In some embodiments and, optionally, in combination of any embodiment described above or below, the at least one environmental condition may be one of: temperature, humidity, vibration, shock, sound, light, presence of air contaminant, acceleration, pH, location, presence of at least one odor, presence of at least one gas (e.g. volatile organic compounds (VOC), nitrogen, ozone, CO2), air pressure, and any combination thereof. For example, the gas sensors may measure one or more of ethylene, ammonia, acetylene, nitrogen, carbon dioxide, oxygen. In some embodiments, the at least one environmental condition may include at least one environmental hazard condition that may negatively affect, without limitation, at least one of a health of a human being and/or an animal, or physical integrity of a physical object.

The terms "environmental alert trigger condition" or "environmental hazard trigger condition" may refer to value (s) and/or rule(s) that may be defined for environmental parameter(s) of the at least one environmental condition. For example, illustrative environmental alert trigger conditions or environmental hazard trigger conditions may be when a detected/observed concentration level of a gas and/or a particulate matter in the air is greater than a predefined concentration level than a safe level that may be defined/mandated by a regulation. The "environmental alert trigger condition" or "environmental hazard trigger condition" may include a predefined time period of exposure to an environmental hazard condition.

The term "predetermined environmental parameter" as defined herein may refer to a predetermined value of an environmental parameter that may be utilized to measure an environmental condition, such as a detected concentration level of CO, $CO_2$, particulate material and/or radon gas concentration levels in the environment, for example.

FIG. 1 depicts a region 5 of an environment around a smart card 20 for detecting environmental conditions, in accordance with one or more embodiments of the present disclosure. FIG. 1 shows a user 10 with smart card 20 in a pant's pocket or on a belt of the user. User 10 may be in a region near to a fire, for example. Smoke 23 emanating from the fire may permeate 25 region 5 around smart card 20. Smoke 23 may reach user 10. Smoke 23 may be present in a low enough concentration that user 10 may not sense it. However, smoke detectors disposed in the circuitry of smart card 20 may detect small concentrations of smoke 23 in environment 5. Smart card 20 may be configured to communicate 27 with mobile device 15 of user 10 and send an alert to computing device 15 of user 10 for alerting user 10 of the smoke and fire hazard detected in environment 5.

The embodiments taught herein provide a technical solution to the problem of providing compact environmental detection sensors for detecting hazardous environmental conditions. Most consumer grade environmental detection sensors are not mounted in a form factor of smart card, but are typically mounted on a wall, for example, and not portable. The environmental detection sensors integrated on a smart card as taught herein also provides environmental hazard detection in places where mounted detectors may not be deployed, or as a backup in case environmental detection sensors fail.

In some embodiments, smart card 20 may be of any suitable size. Smart card 20 may be the size of a standard credit card, for example, typically 85.60×53.98 mm (3.37× 2.13 inches) with a typical thickness of 30 mils (0.76 mm). However, the dimensions of the compact environmental detection sensors may be substantially smaller than these dimensions to fit in smart card 20.

Figure 2A:
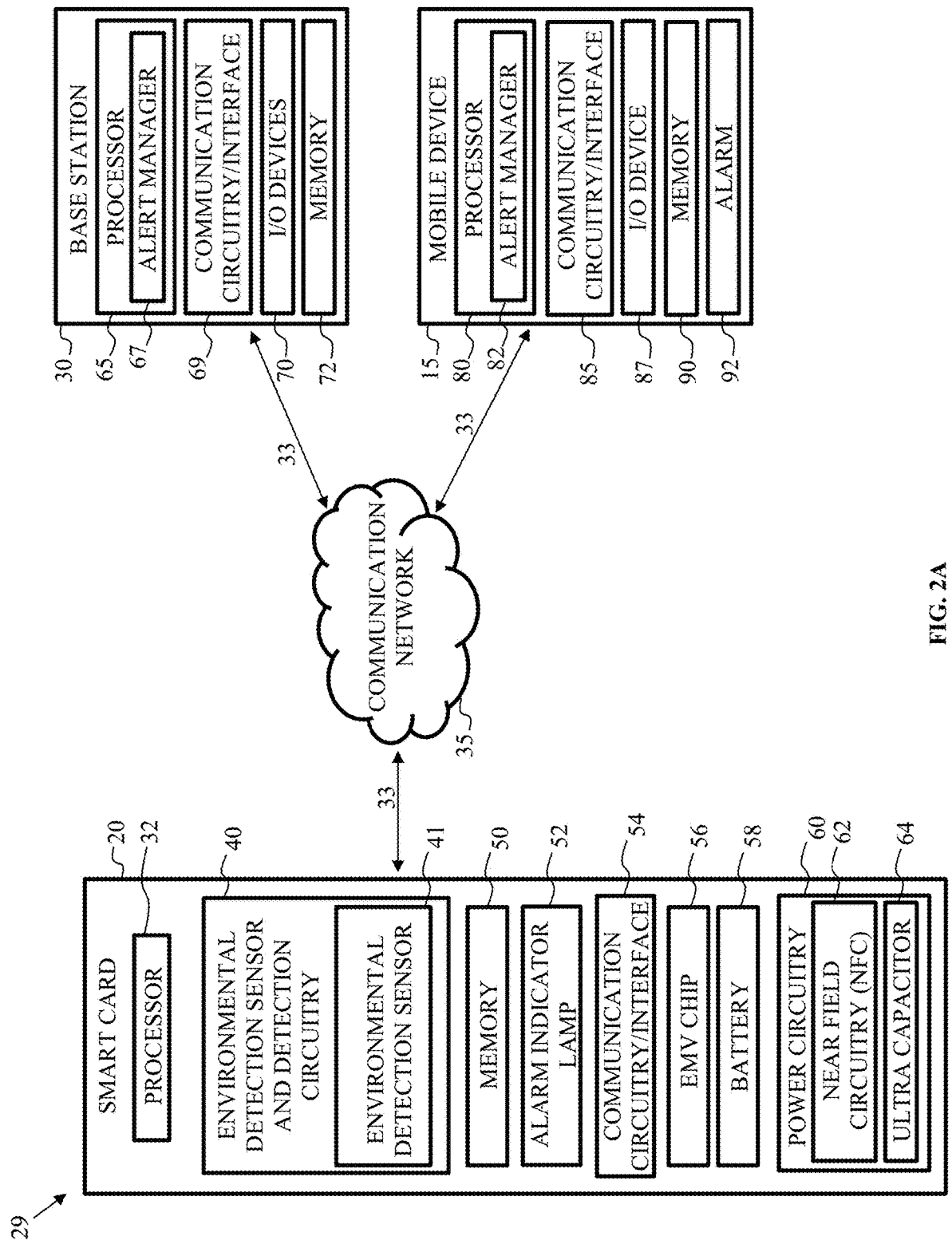
FIGS. 2A and 2B are block diagrams of two exemplary embodiments of a system using a smart card for detecting environmental conditions, in accordance with one or more embodiments of the present disclosure.
Figure 2B:
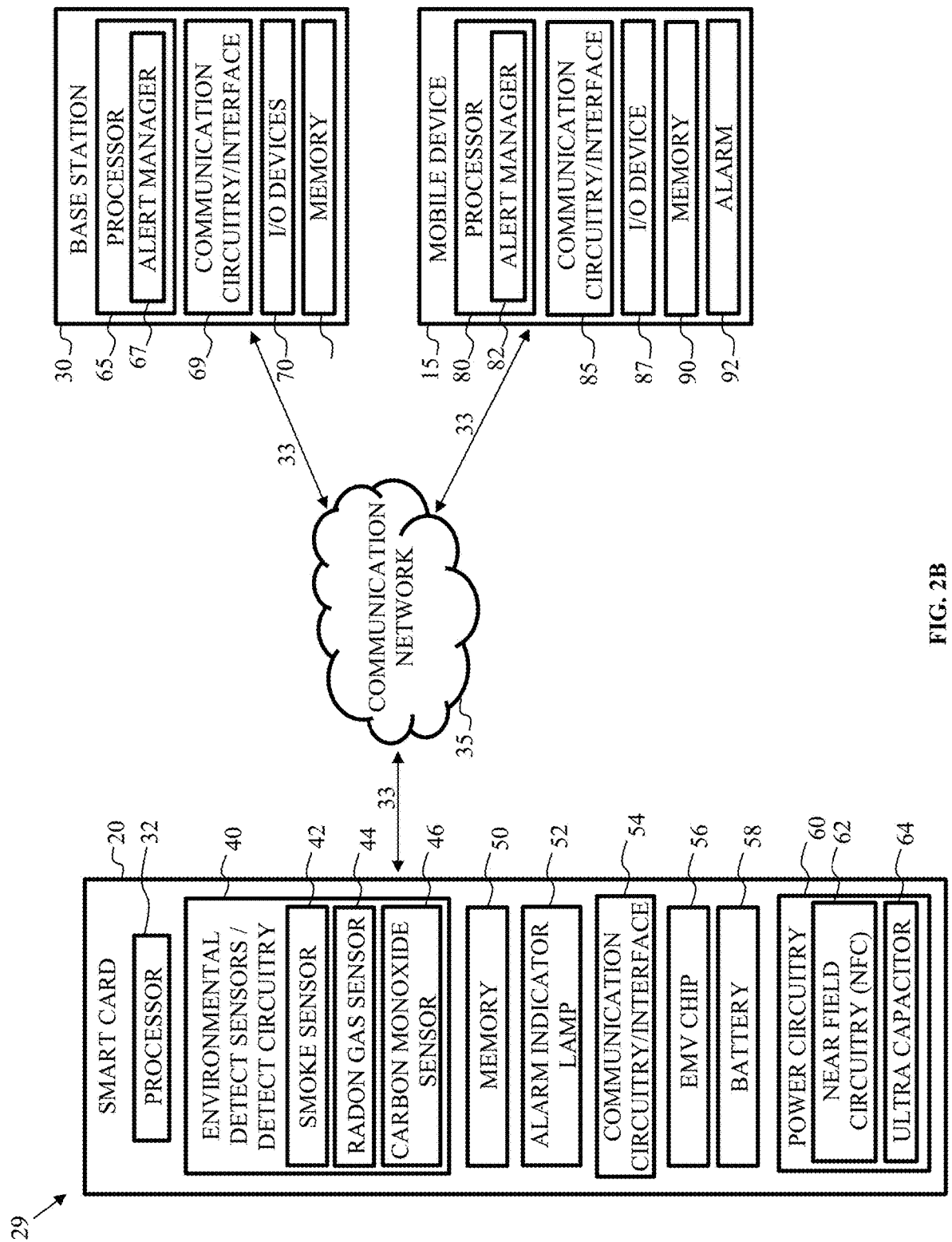

FIGS. 2A and 2B are block diagrams of two exemplary embodiments of a system 29 using smart card 20 for detecting environmental conditions, in accordance with one or more embodiments of the present disclosure. System 29 may include smart card 20, a base station 30, and mobile device 15, all communicating 33 over a communication network 35.

In some embodiments, smart card 20 may include a processor 32, environmental detection sensor(s) and circuitry 40, a memory 50, an alarm indicator lamp 52, communication circuitry and interface 54 including an antenna for communicating 33 over communication network 35, a Europay, Mastercard, and Visa (EMV) chip 56, a battery 58, and power circuitry 60 as shown in FIGS. 2A and 2B.

In some embodiments, base station 30 may include a processor 65, input and output (I/O) devices 70, a memory 72 and communication circuitry and interface 69 for communicating 33 over communication network 35 as shown in FIGS. 2A and 2B. Processor 65 may be configured to execute code such as alert manager module 67 for generating an alert to user 10 that a predetermined environmental alert trigger condition exists upon receiving an alert indication from smart card 20.

In some embodiments, base station 30 may be a fixed computing device, such as a fixed console in a central location of region 5. Base station 30 may be in an office of a company, for example, within or near region 5 and configured to communicate 33 with smart card 20 over communication network 35. When an alert indication is received from smart card 20, base station 30 may generate an alert, such as a sounding an audio alarm, to alert persons in and/or around region 5 that an environment alert trigger condition exists, namely that the environmental detection sensors deployed in smart card 20 of user 10 detected at least one predetermined environmental parameter meeting at least one predetermined environmental alert trigger condition.

In some embodiments, computing device 15 of user 10, such as a mobile device, may include a processor 80, input and output (I/O) devices 87, a memory 90 and communication circuitry and interface 85 for communicating 33 over communication network 35 as shown in FIGS. 2A and 2B. Processor 65 may be configured to execute code such as alert manager module 82 for generating an alert to the user that a predetermined environmental alert trigger condition exists upon receiving an alert indication from smart card 20.

In some embodiments, computing device 15 may include an alarm 92 which may be activated to alert user 10 upon receiving an alert indication from smart card 20 over communication network 35.

In some embodiments, smart card 20 may be paired with computing device 15 using a short distance wireless technology standard such as Bluetooth, for example. Processor 32 may be configured to send an alert to processor 80 using Bluetooth so as to cause alert manager 82 to activate an audio alert using alarm 92 to user 10.

In some embodiments, an environment detection sensor 41 as shown in FIG. 2A may be used to detect the at least one environmental condition. In other embodiments as shown in FIG. 2B, the environmental detection sensor(s) may be selected from, but are not limited to, a smoke sensor 42, a radon gas sensor 44 and a carbon monoxide sensor 46.

In some embodiments, any suitable detection circuitry such as amplifiers, analog-to-digital (A/D) converters, for example, may be used to couple outputs from the environmental detection sensors to processor 32 as shown in FIGS. 2A and 2B. Processor 32 may then determine from the output whether any of the environmental detection sensors detected a predetermined environmental alert trigger condition. When processor 32 may detect the predetermined environmental alert trigger condition, processor 32 may generate an alert to the user. For example, in some embodiments, processor 32 may cause alarm indicator lamp 52 to be lit by a drive output from driver amplifiers in the detection circuitry and/or a speaker disposed in smart card 20 may sound an alert signal to user 10. In other embodiments, processor 32 may send an alert indication over communication network 35 to alert manager 67 and/or alert manager 82 of base station 30 and computing device 15, respectively, that may be each configured to generate a visual and/or an audio alarm.

In some embodiments, an illustrative carbon monoxide sensor 46 may include solid state sensors, such as Micro-Electro-Mechanical Systems (MEMS) sensors, for example, Teledyne Micralyne Metal Oxide MEMS sensors from Micralyne, Inc, Alberta, Canada on a 1.6×1.6 mm die. In other embodiments, an illustrative carbon monoxide sensor 46 may include an array of gold nanotubes where the Au nanotubes convert the CO molecules to $CO_2$ molecules releasing free electrons that may be detected in detection circuitry. The size of individual gold nanoparticles typically ranges from 5 nm to 400 nm in diameter.

In other embodiments, an illustrative carbon monoxide sensor 46 may detect the predetermined environmental parameter of CO levels in region 5. Processor 32 may generate an alert representative of a CO alert condition. The CO alert condition may include, for example, when carbon monoxide sensor 46 detects predefined CO levels of 40 ppm for a predetermined time period of 10 hours, 50 ppm for 8 hours, 70 ppm for 1-4 hours, 150 ppm for 10-50 minutes, and 400 ppm for 4 to 15 minutes. Note that 500 ppm is the maximum allowable concentration for continuous CO exposure over an 8 hour period, as set by the U.S. Occupational Safety and Health Administration (OSHA).

In some embodiments, the illustrative smoke sensor 42 may be sensitive enough to detect minute concentrations of smoke and/or other particulates in the air around the smart card indicative of a fire, even when open fires and/or smoldering fires have not yet developed, and to trigger an alarm signal to alert the user. Smoke sensor 42 may include any combination of photoelectric, electrochemical, and/or ionization type smoke sensors. Photoelectric sensors may use light emitting diodes for detecting particulate matter in the air indicative of smoke, such as smoke generated from a fire. See for example, 2×3 mm Multimode sensor front end from Analog Devices ADFD4000/ADFD4001, Norwood, Mass. Electrochemical sensors.

Smoke sensor 42 may be implemented in MEMS for detecting CO, $CO_2$ and $H_2$ indicative of a fire. For example, a Palladium-doped Tin dioxide with particle size of about 10 nm deposited on MEMS substrate may be used to detect changes in CO with a 50-ppb detection limit. (See for example, *MEMS system for fire detection in the Forest*, V. Guernieri, et al, Proceedings of IMCS 2012—The 14th International Meeting on Chemical Sensors, p. 1173).

In some embodiments, the illustrative smoke sensor 42 may use infrared gas sensing to detect particulates in the air in region 5. With these type of detectors, detecting particulates over a 24-hour time period may be used to trigger an alarm when the particulate densities in the air may be greater than predefined levels of 35 µg/m$^3$ for particulates with diameters less than 2.5 µm, and 150 µg/m$^3$ for particulates with diameters between 2.5-10 µm in the air, for example.

In some embodiments, the illustrative radon gas sensor 44 may detect alpha particle decay associated with radon gas molecules using a matrix of NPN transistors driving an analog-to-digital converter. (See, for example, ARIA module, Rsens, Modena, Italy.) Radon gas concentrations may fluctuate between 5-15 Becquerel per cubic meter (Bq/m$^3$) outdoors and from 10-10,000 Bq/m$^3$ indoors. The U.S. Environmental Protection Agency (EPA) stipulates that corrective measures be taken when radon gas concentration levels are above 148 Bq/m$^3$. Therefore, when radon gas concentration levels at any time reach a predefined level of 148 Bq/m$^3$ for example, an alert may be generated, for example, by processor 32 sending an indication to alert managers 67 and 82 and/or processor 32 causing alarm indicator lamp 52 to be lit.

Although smoke sensor 42, radon gas sensor 44 and CO sensor 46 are shown in FIG. 2 as environmental detection sensors and circuitry 40 in smart card 20, this is not by way of limitation of the exemplary embodiments shown herein. Any environmental detection sensor 40 that may fit into the form factor of smart card 20 may be deployed on smart card 20 for detecting any predetermined environmental parameter, such as low-level concentrations of toxic gases, for example, indicative of environmental hazards.

Figure 3:
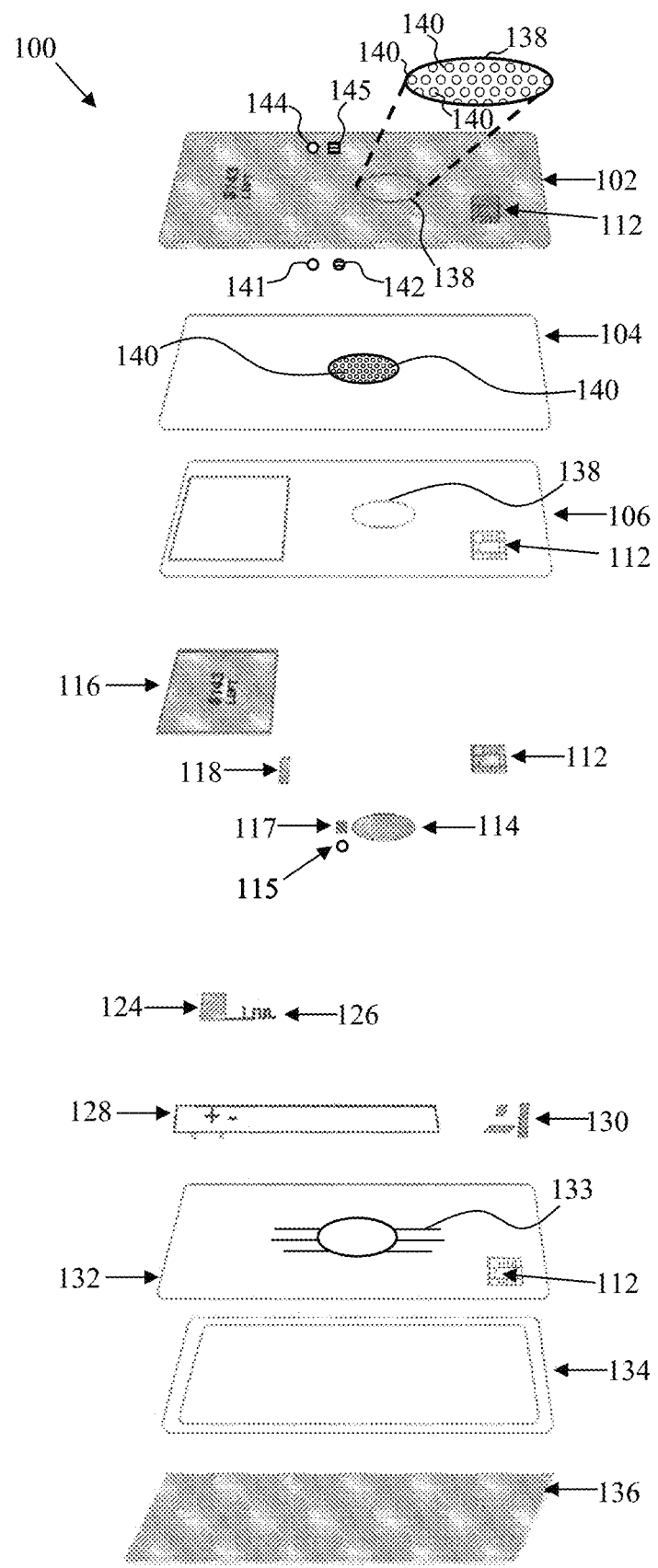
FIG. 3 is an exploded view of a smart card for detecting environmental conditions, in accordance with one or more embodiments of the present disclosure.

FIG. 3 is an exploded view of a smart card 100 for detecting environmental conditions, in accordance with one or more embodiments of the present disclosure. Smart card 100, and smart card 20 from the previous figures, may include a top output layer 102. The top output layer may be a film covering, a plastic covering, and/or the like. The top output layer 102 may be constructed of scratch-resistant and/or scratch-proof materials. Materials that may be used as a top outer layer 102 may include polyvinyl chloride (PVC), polylactic acid (PLA), acrylonitrile butadiene styrene (ABS), polyethylene terephthalate (PET), Polyethylene terephthalate glycol-modified (PET-G), polyester film or plastic sheet (e.g., Mylar), polycarbonate (PC), and/or the like.

In some embodiments, smart card 100 may further include a top shielding layer 104, such as a clear scratch-resistant coating and/or scratch-proof material to protect the underlying components. For example, various scratch-resistant materials include materials coated with a scratch resistant chemical coating, such as a UV curable chemical coating. Scratch-proof materials may include a mineral glass, a sapphire glass, thin film alloys, ITO, ZnO, PVC, PET, BoPET (e.g., Mylar), polyvinylidene fluoride (e.g., Kynar), polyvinylidene difluoride, PC and/or PET-G. The term "first protective layer" may refer to herein as top output layer 102, top shielding layer 104, or both.

In some embodiments, smart card 100 may include a potting 106 or filler epoxy around the electrical components to provide strength and/or water resistance. Potting 106 may be formed using injection molding, such as over molding and/or multi-shot to encapsulate the components of smart card 100. For example, injection molding may include ABS, thermoplastic elastomers (TPE), thermoplastic vulcanizate (TPV), thermoplastic polyurethane (TPU), PET, polycarbonates (PC), cold lamination of the outer films to the body of the card using thermoactive adhesives, hot lamination of the outer films to the body of the card using thermoactive adhesives, and/or silicone.

In some embodiments, smart card 100 may include an EMV chip 112 with a number of contacts that may interact with and/or be connected to a terminal with an EMV card reader, for example, that is configured to read data stored on EMV chip 112. During an EMV transaction, application cryptograms may be used to send and receive data packets between the smart card 100 and a terminal, such as a merchant terminal. For example, data packets may include user authentication information which an acquisition system and/or issuing financial institution may use to authenticate a smart card 100 during a transaction. Various cryptographic protocols and/or methods may be used in this data transmission and reception process. Moreover, during a transaction issuing financial institutions and/or acquisition systems may return script commands to the EMV chip 112 via a terminal. These script commands and/or data packets may be transmitted between parties over a network (e.g., communication network 35). Script commands may be used, for example, to block transactions, change transaction data stored on the EMV chip (e.g., transaction history, account limits, account balance, and/or the like). Offline data authentication may also take place using, for example public key cryptography to perform payment data authentication. For example, offline data authentication may use Static Data Authentication (SDA), Dynamic Data Authentication (DDA), and/or Combined Data Authentication (CDA).

In some embodiments, processor 32 of smart card 100 may receive outputs from at least one environmental detection sensor 114. The at least one environmental detection sensor may include, but is not limited to, smoke sensor 42, radon gas sensor 44, and CO sensor 46, as shown in FIG. 2. The at least one environmental detection sensor may include sensors for detecting any type of noxious, toxic, and/or poisonous gas in the environment around smart card 100 when the concentration levels are low enough that the user may not yet sense the hazard.

In some embodiments, a porous membrane 138 may be formed with a plurality of pores 140 in top output layer 102 and/or top protective layer 104 so as to expose environmental detection sensors 114 to an environment around smart card 100.

In some embodiments, other sensors not shown in FIG. 2 which are not related to detecting predetermined environmental parameters as discussed hereinabove may be placed in any portion of smart card 100 to detect, for example, touch, light, heat, energy, and/or the like. For example, a sensor may be placed around the outer edges of a smart card 100 or at any spot within the smart card 100. Other sensors also may include the entire exterior surface of smart card 100. The other sensors may include an activation sensor, an operation sensor, a capacitive touch sensor, a piezoelectric sensor, an inductive sensor, load cells, a light sensor, a temperature sensor, a resistive touchscreen, including, for example, an analogue matrix real (AMR) sensors, and/or the like. The other sensors may include accelerometers and/or photosensors to detect motion input.

In some embodiments, a display 116 may be provided within the smart card 100. Although the display as shown includes, for example, a dot matrix display, a number of other display options may be included in the smart card 100. Display 116 may be configured to display an alert to user 10 about the type of environmental hazard detected in the region around smart card 100 (e.g., region 5 in FIG. 1) and/or the concentration levels of gases and/or particulate matter in the environment.

In some embodiments, smart card 100 may include a display driver 118 that translates instructions from a microcontroller 124 into display images to be displayed using display components 116. A display driver 118 may include an integrated circuit (IC), a state machine, and/or the like that provides an interface function between the display and the microcontroller 124. A display driver 118 may include memory (e.g., RAM, Flash, ROM, and/or the like) and/or firmware that includes font display data.

In some embodiments, microcontroller 124 may include a processor such as processor 32 in FIG. 2 executing firmware for managing output signals from environmental detection sensors 114 and/or for managing other functions of smart card 100 such as performing operations at a terminal (e.g., merchant transactions at a merchant terminal).

In some embodiments, smart card 100 may include an antenna 126. Antenna 126 may include, for example, a loop antenna, a fractal antenna, and/or the like. Antenna 126 may transmit to and receive signals from computing device 15. Communication circuitry may be used to communication any functions performed by smart card 100 over a communication network such as in communication network 35 in FIG. 2.

In some embodiments, microcontroller 224 may communicate with EMV chip 112, sensor(s) 114, power management 130, antenna 126, energy storage component 128, display 116, display driver 118, and/or any other component of smart card 100. Microcontroller 124 may control the card operations to conduct transactions and/or display data as described throughout this specification.

In some embodiments, when microcontroller 224 may detect from the output of environmental detection sensors detecting predetermined environmental parameters meeting an environmental alert trigger condition, the processor of microcontroller 124 may generate an alert that is representative of the detected environmental alert trigger condition (e.g., environmental hazard trigger condition).

In various embodiments, microcontroller 224 may generate an alert for display on display 116. Microcontroller 224 may generate an alert that is sent over communication network 35 to alert manager 67 on base station 30 and/or to alert manager 82 on computing device 15 (e.g., mobile device of user 10). Microcontroller 224 may generate an audio alarm through a speaker 142 mounted on smart card 100 through an opening 145 on top output layer 102. Microcontroller 224 may generate a visual alert by illuminating an indicator lamp 141 mounted on smart card 100 through an opening 144 on top output layer 102.

In some embodiments, smart card 100 may include an energy storage component 128, such as a battery. Although energy storage component 128 is depicted as a single component, energy storage component 128 may include a series of energy storage components. By way of example, energy storage component 128 may include a lithium polymer battery, a lithium-metal battery, lithium-ceramic battery, and/or any other type of battery. Energy storage component 128 may be constructed out of rigid materials, semiflexible materials, and/or flexible materials. Energy storage component 128 may provide power to a plurality of circuitry elements of smart card 100. Energy storage component 128 may be, for example, a battery/potting component also providing mechanical support to smart card 100.

In some embodiments, smart card 100 may include a power management component 130 that may manage the charging and discharging of energy storage component 128. Power management component 230 may convert voltage to a predetermined level in order to operate smart card 100 as discussed throughout the specification. Power management component 130 and/or energy storage 128 may include, for example, solar power cells to convert solar energy into an electrical current within a solar panel. Power management component 130 and/or energy storage component 128 may include connections to the other sensors to receive input and activate smart card 100 (e.g., motion input, thermal input, manual input, touch input, and/or the like).

In some embodiments, an ultracapacitor 117 may provide fast powering of the smart card circuitry, fast charging of energy storage component 128, such as a battery, coupled to the circuitry, or both, when connected to an external terminal. In other embodiments, near field communication (NFC) circuitry 115 may provide powering the smart card circuitry, charging of energy storage component 128, such as a battery, coupled to the circuitry, or both when smart card 100 may be placed within an externally generated electromagnetic field configured to excite NFC circuitry 115.

In some embodiments, smart card 100 may include a substrate 132, such as a flexible printed circuit board (PCB) with a first side and a second side (e.g., a top side and a bottom side). Substrate 132 may include a PCB mounted in a flexible plastic substrate, such as for example, a polyimide, polyether ether ketone, and/or a transparent conductive polyester film. A flexible PCB may be printed, using, for example screen printing, 3D printing, and/or the like, to arrange circuits on a material, such as polyester.

In some embodiments, substrate 132 may hold a plurality of circuitry elements that may be interconnected with a plurality of electronic interconnects 133. The electronic interconnects may be coupled to the first side of substrate 132, the second side of substrate 132, or both for connecting the smart card circuitry to an external terminal, for example. The plurality of circuitry elements may include at least: (1) at least one environmental detection sensor for respectively detecting at least one predetermined environmental parameter (e.g., smoke, CO, and/or radon concentration levels), (2) power circuitry for powering the circuitry elements (e.g., battery, power management circuitry, ultracapacitors, and/or near field circuitry), or (3) a processor (e.g., processor 32 such as in microcontroller 224).

In some embodiments, the flexible PCB may include electronic components and connections that power smart card 100. The flexible PCB may control and/or provide integration between the components of card 100. For example, flexible PCB may mechanically support and electrically connect the electronic components of smart card 100 using, for example, conductive tracks, pads, and/or other features (e.g., interconnects 133). A flexible PCB may also provide antenna support.

In some embodiments, substrate 132 may include a flexible printed circuit (FPC), which may be used in place of or in conjunction with flexible PCB. FPC may be fabricated with photolithographic technology, such as light exposure of a film material laminated to substrate and/or conductive layers (e.g., interconnects 133). FPC may be printed, silkscreened, and/or the like. FPC may be used as a structural member for the electronic components of smart card 100.

In some embodiments, smart card 100 may include a chassis 134 as a frame or supporting structure. Chassis 134 may be a mount for a flexible PCB 132 and may be constructed out of flexible or semi-flexible material as well. Chassis 134 may be constructed out of a number of materials, including but not limited to, PVC, PC, ABS, styrene, polycarbonate, polyester, PET, any material that is easily molded, deposited, or laser cut (e.g., organic or inorganic material such as paper, plastic, and/or engineered ceramics), and/or the like. Chassis 134 may be constructed out of a conductive material. Chassis 134 may increase the rigidity of smart card 100 to prevent damage.

Card backing 136 may be made of similar material to that of the output layer 102 and/or the top shielding layer 104. Card backing 136 may be made out of a plastic material. Card backing 136 may also be referred to herein as a "second protective layer". Furthermore, porous membrane 138 may also be disposed in card backing 136 (e.g., in the second protective layer) for exposing environment detection sensors 114 held in substrate 132 to the environment around smart card 100.

It should be noted that the terms "first protective layer" and "second protective layer" may be used interchangeably and porous membrane 138 may be disposed on either the first protective layer, second protective layer, or both. The first protective layer and the second protective layer may cover the first side and the second side of substrate 132. The term "proximate" with regard to the plurality of pores 140 in porous membrane 138 are in a region proximate to environmental detection sensors 114 refers to the pores being close enough and/or touching environmental detection sensors 114 in smart card 100 so as to allow environmental detection sensors 114 to sample and/or to be coupled to the environment in region 5 around smart card 100.

The term "porous membrane" 138 may refer to a region formed in the first protective layer, the second protective layer, or both having the plurality of pores. Porous membrane 138 may be formed directly in the first protective layer, the second protective layer, or both, by the same processes used to form those respective layers. Porous membrane 138 may be formed externally from any suitable material and bonded onto a hole exposing environmental detection sensors 114 held in the substrate for covering environmental detection sensors 114, yet while allowing environmental detection sensors 114 to sample the environment in region 5 around smart card 100.

Figure 4:
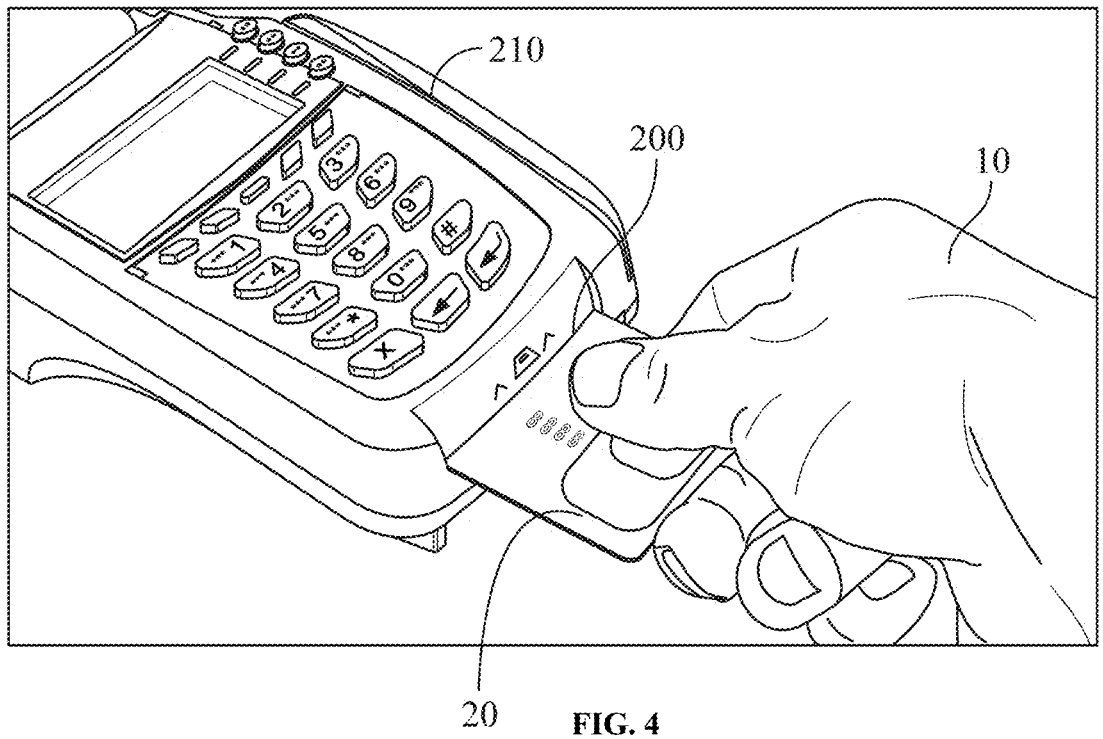
FIG. 4 depicts a terminal for charging a smart card configured to detect environmental conditions, in accordance with one or more embodiments of the present disclosure.

FIG. 4 depicts a terminal 210 for charging smart card 20 configured to detect environmental conditions, in accordance with one or more embodiments of the present disclosure. A hand of user 10 may be used to insert smart card 20 into a slot 200 of terminal 210.

In some embodiments, terminal 210 as shown in FIG. 4 may be a point of sale (POS) terminal managed by an entity such as a merchant, for example. In other embodiments, terminal 210 may be any suitable smart card charger used for charging battery 58 and/or ultracapacitor 64 for powering circuitry of smart card 20 when smart card 20 is not in contact with terminal 210.

Figure 5:
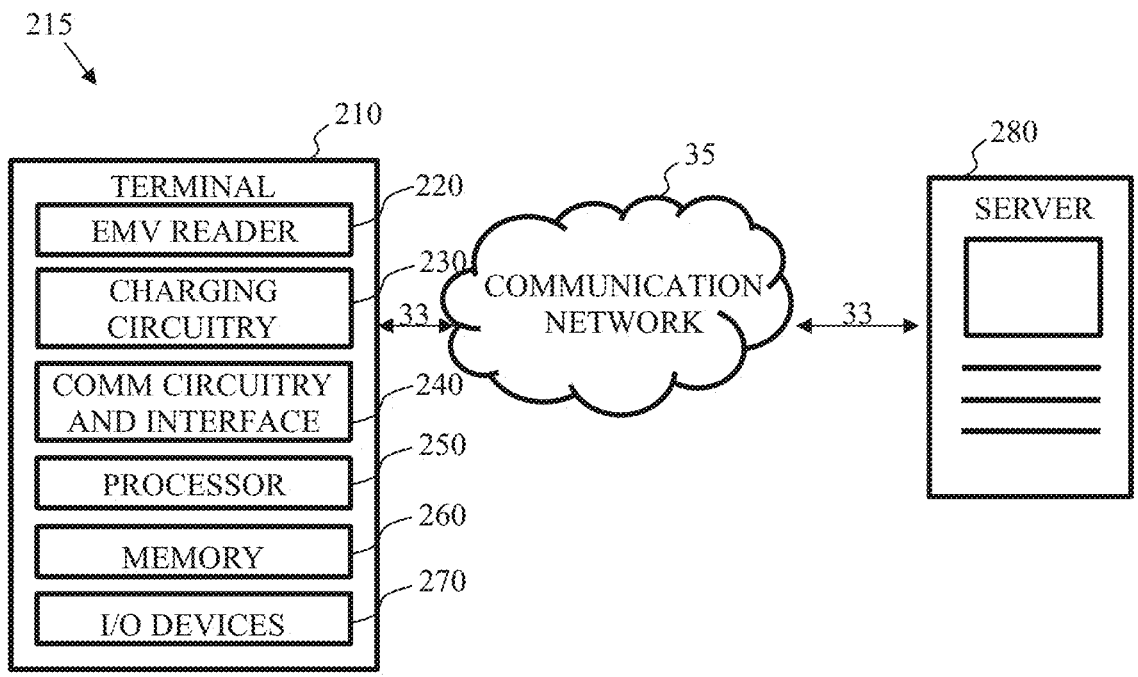
FIG. 5 depicts a system for using a smart card to perform operations on a terminal, in accordance with one or more embodiments of the present disclosure.

FIG. 5 depicts a system 215 for using smart card 20 to perform operations on terminal 210, in accordance with one or more embodiments of the present disclosure. Terminal 210 may be a computing terminal managed by a server 280 of an entity such as a merchant. The term "entity" may refer to a person, an individual, a group of individuals, a partnership, an organization, and/or a business. The entity may perform operations or transactions with users, such as customers of the entity, on terminal 210 managed by entity server 280 over communication network 35. Charging circuitry 230 may include interconnects and/or conductive interfaces to contact smart card 100 when placed in slot 200 of terminal 210 so as to charge the smart card circuitry while in slot 200 and/or to charge energy storage component 128.

In some embodiments, terminal 210 may include an EMV chip reader 220, charging circuitry 230, a processor 250, a memory 260, I/O devices 270, and communication circuitry and interface 240 for communicating 33 with entity server 280 over communication network 35.

In some embodiments, user 10 may insert smart card 20 into slot 200 and into EMV reader 220. EMV reader 220 may read the authentication information stored on EMV chip 56 such as personal identification information about user 10, permissions for performing operations in system 215, and/or a credit card number associated with an account of user 10 to allow financial transactions between user 10 and the entity, such as for the purchase of good and/or services sold by the entity, for example.

Figure 6:
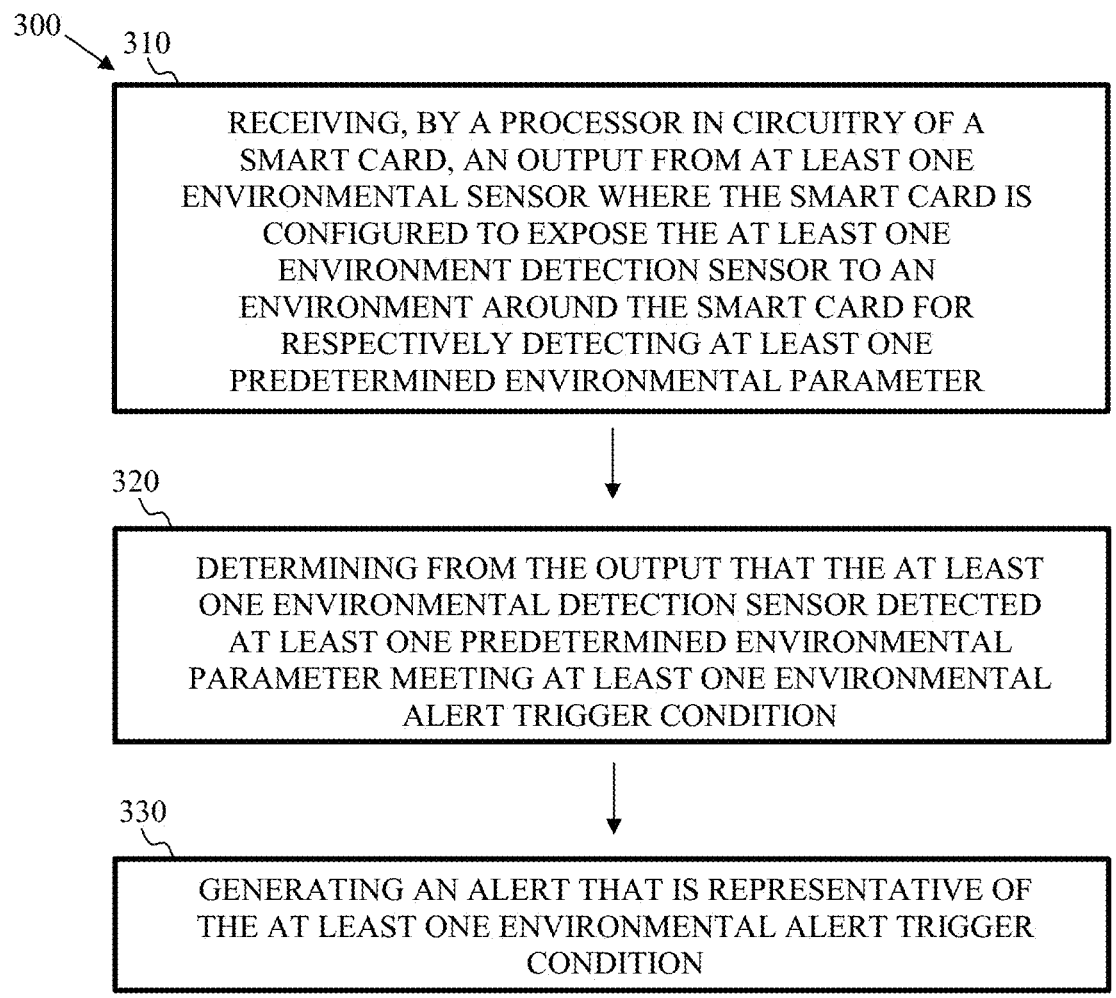
FIG. 6 is a flowchart of an exemplary method for detecting environmental conditions with a smart card, in accordance with one or more embodiments of the present disclosure.

FIG. 6 is a flowchart of an exemplary method 300 for detecting environmental conditions with smart card 20, in accordance with one or more embodiments of the present disclosure. Method 300 may be performed by processor 32.

Method 300 may include receiving 310, by processor 32 in circuitry of smart card 20, an output from at least one environmental sensor where the smart card is configured to expose the at least one environmental sensor to an environment around the smart card for respectively detecting at least one predetermined environmental parameter.

Method 300 may include determining 320 for the output that the at least one environmental detection sensor detected at least one predetermined environmental parameter meeting at least one environmental alert trigger condition.

Method 300 may include generating 330 an alert that is representative of the at least one environmental alert trigger condition.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk(™), TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less.

In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer module", "module", "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) iOS; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, the terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTRO, SHA-1, SHA-2, Tiger (TTH),WHIRL-POOL, RNGs). The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

1. A smart card, comprising:
  a substrate with a first side and a second side;
  a first protective layer and second protective layer;
  wherein the first protective layer covers the first side and the second protective layer covers the second side of the substrate;
  circuitry held in the substrate comprising a plurality of electronic interconnects for interconnecting a plurality of circuitry elements;
  wherein the plurality of circuitry elements comprises:

(i) at least one environmental detection sensor for respectively detecting at least one predetermined environmental parameter;
(ii) power circuitry for powering the circuitry elements; and
(iii) a processor;
wherein the processor is configured to:
receive an output from the at least one environmental detection sensor;
determine from the output that the at least one environmental detection sensor detected the at least one predetermined environmental parameter meeting at least one environmental alert trigger condition; and
generate an alert that is representative of the at least one environmental alert trigger condition; and
wherein the first protective layer, the second protective layer, or both, comprise a plurality of pores in at least one region proximate to the at least one environmental detection sensor held in the substrate for exposing the at least one environmental detection sensor held in the substrate to an environment around the smart card.

2. The smart card according to clause 1, wherein the at least one environmental detection sensor is configured to detect smoke, radon gas, carbon monoxide, or any combination thereof in the environment around the smart card.

3. The smart card as in any of the preceding clauses, wherein the processor is configured to generate the alert when the at least one environmental detection sensor detects a predefined level of smoke, radon gas, carbon monoxide, or any combination thereof in the environment around the smart card.

4. The smart card as in any of the preceding clauses, wherein the at least one environmental detection sensor comprises a micro-electro-mechanical sensor (MEMS).

5. The smart card as in any of the preceding clauses, wherein the substrate comprises a printed circuit board (PCB).

6. The smart card as in any of the preceding clauses, further comprising an alarm indicator lamp and detection circuitry, and wherein the processor is configured to generate the alert by using a drive output from the detection circuitry to light the alarm indication lamp.

7. The smart card as in any of the preceding clauses, wherein the circuitry comprises communication circuitry for the smart card to communicate with a computing device over a communication network, and wherein the processor is configured to generate the alert by sending the alert to the computing device over the communication network.

8. The smart card as in any of the preceding clauses, wherein the electronic interconnects are coupled to the first side, the second side, or both for connecting the circuitry in the smart card to an external terminal.

9. The smart card as in any of the preceding clauses, wherein the circuitry comprises a Europay Mastercard Visa (EMV) chip for performing transactions with the external terminal.

10. The smart card as in any of the preceding clauses, wherein the power circuitry comprises a battery, and wherein the battery is charged when connected to the external terminal.

11. The smart card as in any of the preceding clauses, wherein the circuitry further comprises an ultracapacitor for providing fast powering of the circuitry, fast charging of a battery coupled to the circuitry, or both, when connected to the external terminal.

12. The smart card as in any of the preceding clauses, wherein the power circuitry comprises near field communication (NFC) circuitry for powering the circuitry, charging a battery coupled to the circuitry, or both, when the smart card is within placed with an external electromagnetic field.

13. The smart card as in any of the preceding clauses, wherein the first protective layer, the second protective layer, or both comprises a porous membrane with the plurality of pores in the at least one region.

14. A method, comprising:
receiving, by a processor in circuitry of a smart card, an output from at least one environmental detection sensor;
wherein the at least one environmental detection sensor is held in a substrate;
wherein the smart card is configured to expose the at least one environmental detection sensor held in the substrate to an environment around the smart card for respectively detecting at least one predetermined environmental parameter;
determining, by the processor, from the output that the at least one environmental detection sensor detected the at least one predetermined environmental parameter meeting at least one environmental alert trigger condition; and
generating, by the processor, an alert that is representative of the at least one environmental alert trigger condition.

15. The method according to clause 14, wherein determining that the at least one environmental detection sensor detected the at least one predetermined environmental parameter meeting the at least one environmental alert trigger condition comprises determining that the at least one environmental detection sensor detected the at least one predetermined environmental parameter meeting the at least one environmental alert trigger condition for a predefined period of time.

16. The method according to clauses 14 or 15, wherein the at least one environmental detection sensor is configured to detect smoke, radon gas, carbon monoxide, or any combination thereof in the environment around the smart card.

17. The method according to clauses 14, 15, or 16, generating the alert comprises generating the alert when the at least one environmental detection sensor detects a predefined level of smoke, radon gas, carbon monoxide, or any combination thereof in the environment around the smart card.

18. The method according to clauses 14, 15, 16 or 17, wherein generating the alert comprises generating the alert by using a drive output from detection circuitry to light an alarm indication lamp.

19. The method according to clauses 14, 15, 16, 17 or 18, wherein generating the alert comprises generating the alert by sending the alert to a computing device over a communication network.

20. The method according to clauses 14, 15, 16, 17, 18 or 19, further comprising performing, by the processor, transactions with an external terminal using a Europay Mastercard Visa (EMV) chip in the circuitry when the smart card is connected to an external terminal.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. An environmental detection system, comprising:
at least one smart card associated with a user; and
a mobile computing device associated with the user comprising a mobile device processor, a mobile device display, and a mobile device communication circuitry for communicating with the at least one smart card over a communication network;
   wherein the mobile device processor is configured to pair with the at least one smart card through the mobile device communication circuitry using a short distance wireless technology;
   wherein the at least one smart card comprises:
      a substrate;
      a communication circuitry configured to communicate with the mobile computing device using the short distance wireless technology;
      at least one environmental detection sensor for respectively detecting at least one predetermined environmental parameter; and
      at least one smart card processor configured to:
         pair with the mobile computing device using the short distance wireless technology;
         receive an output from the at least one environmental detection sensor;
         determine from the output that the at least one environmental detection sensor detected the at least one predetermined environmental parameter meeting at least one environmental alert trigger condition;
         generate an alert that is representative of the at least one environmental alert trigger condition; and
         send via the communication circuitry using short distance wireless technology, instructions to configure the mobile computing device to send an alert indication over the communication network to a basestation associated with the user,
         (ii) actuate an alarm,
         (iii) display the alert indication on the mobile device display, or
         (iv) any combination thereof;
      wherein the at least one smart card processor, the communication circuitry, and the at least one environmental detection sensor are held in the substrate;
      wherein the substrate comprises a plurality of pores in at least one region proximate to the at least one environmental detection sensor held in the substrate; and
         wherein the plurality of pores exposes the at least one environmental detection sensor held in the substrate to an external environment around the at least one smart card.

2. The environmental detection system according to claim 1, wherein the short distance wireless technology is a Bluetooth technology.

3. The environmental detection system according to claim 1, wherein the at least one smart card comprises an antenna which enables the communication circuitry to send the instructions through the antenna using the short distance wireless technology to configure the mobile computing device.

4. The environmental detection system according to claim 1, wherein the at least one environmental detection sensor is configured to detect smoke, radon gas, carbon monoxide, or any combination thereof in the external environment around the at least one smart card.

5. The environmental detection system according to claim 1, wherein at least one smart card processor is configured to generate the alert when the at least one environmental detection sensor detects a predefined level of smoke, radon gas, carbon monoxide, or any combination thereof in the external environment around the at least one smart card.

6. The environmental detection system according to claim 1, wherein the at least one environmental detection sensor comprises a micro-electro-mechanical sensor (MEMS).

7. The environmental detection system according to claim 1, wherein the substrate comprises a printed circuit board (PCB).

8. The environmental detection system according to claim 1, wherein the at least one smart card comprises an alarm indicator lamp and a driver amplifier; and
   wherein the at least one smart card processor is configured to provide an indication of the alert on the at least one smart card by using a drive output from the driver amplifier to light the alarm indicator lamp.

9. The environmental detection system according to claim 1, wherein the at least one smart card comprises at least one electronic interconnect coupled to a first side of the substrate, a second side of the substrate, or both for connecting circuitry in the at least one smart card to an external terminal.

10. The environmental detection system according to claim 1, wherein the at least one smart card comprises a Europay Mastercard Visa (EMV) chip for performing transactions with an external terminal.

11. The environmental detection system according to claim 1, wherein the at least one smart card comprises a battery; and
   wherein the battery is charged when the at least one smart card is connected to an external terminal.

12. The environmental detection system according to claim 1, wherein the at least one smart card comprises near field communication (NFC) circuitry for powering circuitry in the at least one smart card, charging of a battery coupled to the circuitry, or both when the at least one smart card is placed within an external electromagnetic field.

13. The environmental detection system according to claim 1, wherein the at least one smart card comprises a first protective layer on a first side of the substrate, a second protective layer on a second side of the substrate, or both comprises a porous membrane with the plurality of pores in the at least one region.

14. The environmental detection system according to claim 1, wherein the at least one environmental detection sensor uses infrared gas sensing.

15. A method, comprising:
receiving, by at least one processor in circuitry of at least one smart card associated with a user, an output from at least one environmental detection sensor;
   wherein the at least one smart card comprises a display and a communication circuitry configured to communicate with a mobile computing device associated with the user using a short distance wireless technology;
   wherein the at least one environmental detection sensor is held in a substrate;
   wherein at least one smart card is configured to expose the at least one environmental detection sensor held in the substrate to an external environment around the at least one smart card for respectively detecting at least one predetermined environmental parameter through a plurality of pores proximate to the at least one environmental detection sensor and formed in the substrate;

pairing, by the at least one processor, with the mobile computing device using the short distance wireless technology;

determining, by the at least one processor, from the output that the at least one environmental detection sensor detected the at least one predetermined environmental parameter meeting at least one environmental alert trigger condition;

generating, by the at least one processor, an alert that is representative of the at least one environmental alert trigger condition; and sending, by the at least one processor, via the communication circuitry using short distance wireless technology, instructions to configure the mobile computing device to:
(i) send an alert indication over a communication network to a basestation,
(ii) actuate an alarm,
(iii) display the alert indication on a mobile device display, or
(iv) any combination thereof.

16. The method according to claim 15, wherein the short distance wireless technology is a Bluetooth technology.

17. The method according to claim 15, wherein the sending, via the communication circuitry using short distance wireless technology, the instructions to configure the mobile computing device comprises enabling the communication circuitry to send the instructions to configure the mobile computing device through an antenna in the at least one smart card using the short distance wireless technology.

18. The method according to claim 15, wherein the at least one environmental detection sensor is configured to detect smoke, radon gas, carbon monoxide, or any combination thereof in the external environment around the at least one smart card.

19. The method according to claim 15, wherein the generating of the alert comprises generating the alert when the at least one environmental detection sensor detects a predefined level of smoke, radon gas, carbon monoxide, or any combination thereof in the external environment around the at least one smart card.

20. A method, comprising:
providing at least one smart card associated with a user;
  wherein the at least one smart card comprises:
    a substrate;
    a communication circuitry configured to communicate with a mobile computing device associated with the user using a short distance wireless technology;
    at least one environmental detection sensor for respectively detecting at least one predetermined environmental parameter; and
    at least one smart card processor configured to:
      pair with the mobile computing device using the short distance wireless technology;
      receive an output from the at least one environmental detection sensor;
      determine from the output that the at least one environmental detection sensor detected the at least one predetermined environmental parameter meeting at least one environmental alert trigger condition;
      generate an alert that is representative of the at least one environmental alert trigger condition; and
      send via the communication circuitry using short distance wireless technology, instructions to configure the mobile computing device to
      '(i) send an alert indication over a communication network to a basestation,
      (ii) actuate an alarm,
      (iii) display the alert indication on a mobile device display, or
      (iv) any combination thereof;
    wherein the at least one smart card processor, the communication circuitry, and the at least one environmental detection sensor are held in the substrate;
    wherein the substrate comprises a plurality of pores in at least one region proximate to the at least one environmental detection sensor held in the substrate; and
    wherein the plurality of pores exposes the at least one environmental detection sensor held in the substrate to an external environment around the at least one smart card.

* * * * *